(12) United States Patent
Livingston

(10) Patent No.: US 6,614,454 B1
(45) Date of Patent: Sep. 2, 2003

(54) SCHEME FOR PRESENTATION OF MULTIPLE PRINT-JOB MODIFICATION ELEMENTS IN A PRINTING SOFTWARE USER INTERFACE

(75) Inventor: Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,383

(22) Filed: Oct. 29, 1999

(51) Int. Cl.[7] ................................................ G06F 3/14
(52) U.S. Cl. ....................... 345/781; 345/784; 345/786; 345/810; 345/788; 715/527
(58) Field of Search ................................. 345/781, 784, 345/786, 788, 810, 792, 793, 800; 715/527, 910, 526

(56) References Cited

U.S. PATENT DOCUMENTS

| | | | | |
|---|---|---|---|---|
| 5,727,135 A | * | 3/1998 | Webb et al. ............... | 358/1.14 |
| 5,953,007 A | * | 9/1999 | Center et al. .............. | 345/764 |
| 6,222,545 B1 | * | 4/2001 | Suzuki et al. .............. | 345/418 |
| 6,505,252 B1 | * | 1/2003 | Nagasaka .................. | 709/232 |

FOREIGN PATENT DOCUMENTS

| | | | |
|---|---|---|---|
| EP | 0803795 A1 | 10/1997 | ............ G06F/3/12 |
| EP | 0889390 A1 | 1/1999 | ............ G06F/3/12 |

\* cited by examiner

*Primary Examiner*—Kristine Kincaid
*Assistant Examiner*—Thomas T. Nguyen

(57) ABSTRACT

A method of displaying multiple printer options in a graphical user interface includes dividing a viewing window into first and second portions separated by a first divider including a first visible affordance and displaying a scrollable list of features in the first portion together with a scroll bar. A currently selected one of the features is differentiated from non-selected features in the list in a first visually distinct manner and other selected features of the list are differentiated from non-selected features in the list in a second visually distinct manner. The method also includes dividing the second portion into first and second sub-portions separated by a second divider including a second visible affordance and displaying a print preview image of a selected page in a document that is to be printed in the first sub-portion. The selected page includes the currently selected one of the features. The method also includes displaying controls for the currently selected feature in the second sub portion.

6 Claims, 4 Drawing Sheets

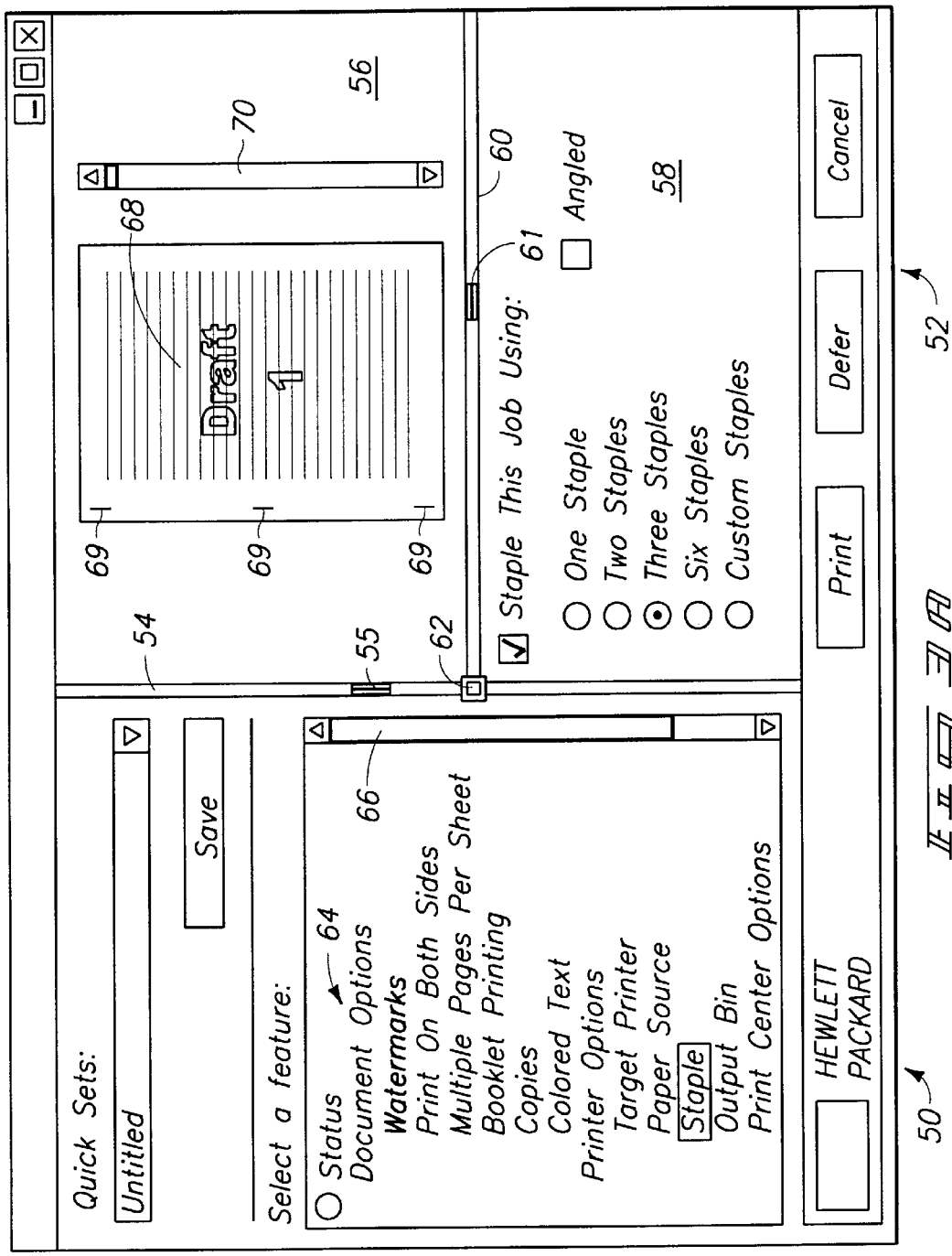

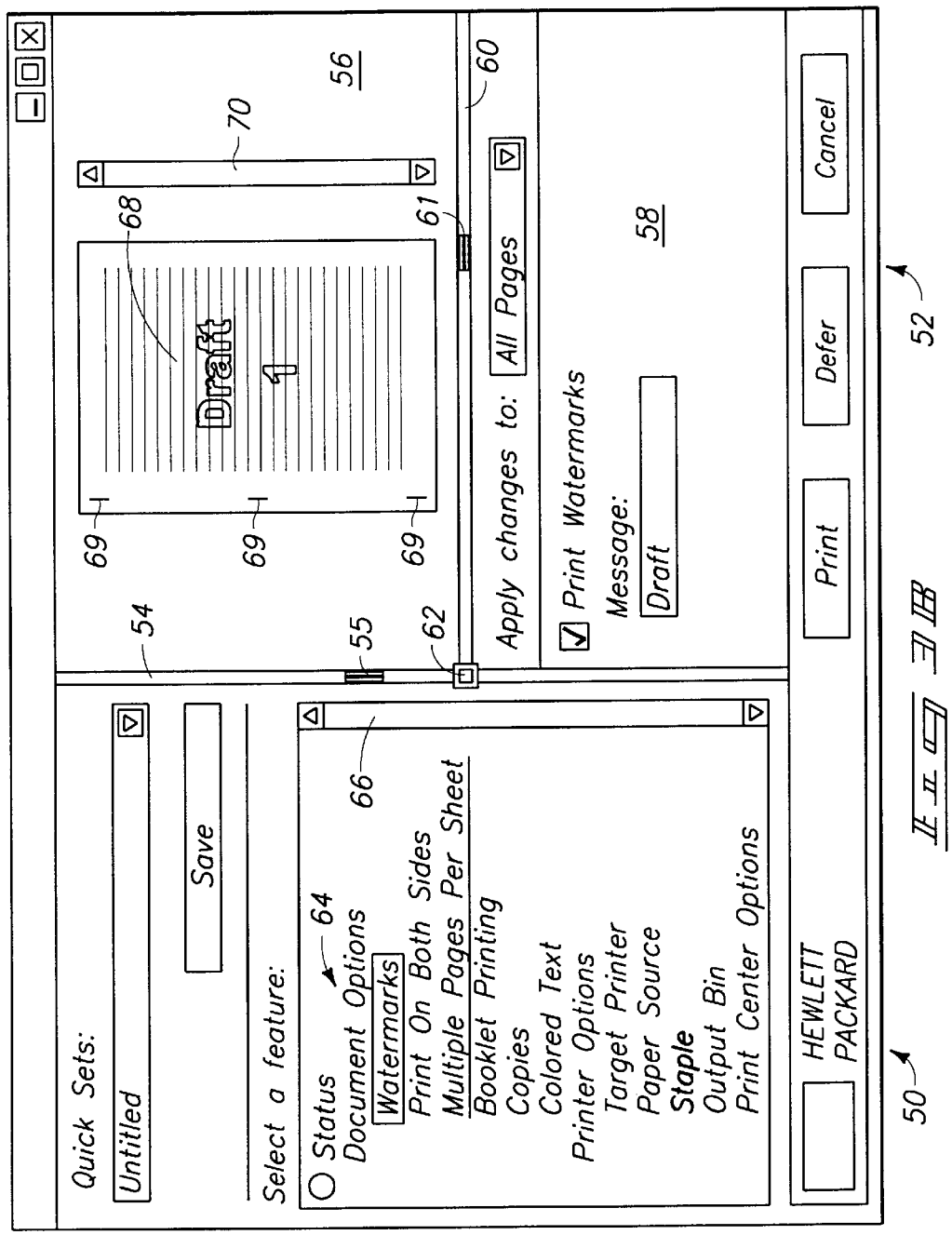

SCHEME FOR PRESENTATION OF MULTIPLE PRINT-JOB MODIFICATION ELEMENTS IN A PRINTING SOFTWARE USER INTERFACE

FIELD OF THE INVENTION

The invention relates to printers and computer networks. More particularly, the invention relates to selection of print features.

BACKGROUND OF THE INVENTION

Over the last several decades, computer systems have become increasingly complex, and, at the same time, have been modified to provide increasing numbers of options, capabilities and customization features for specific tasks. Printer technology is a dramatic example of the increased capabilities that even modest modern computer systems offer compared to those of a few decades ago. Widespread adoption of features allowing on-the-fly modification of print parameters (e.g., font, print size, mixed graphic/text output, selection of multiple printers, paper sources etc.) permit very complex printer operations to be carried out with relative ease, compared to what is possible with older print technologies, such as those using daisy-wheel printing systems.

The increased capabilities found within modern printer systems requires increased sophistication in the commands that are sent to the printer in order to carry out the user's desired print options. In turn, the user has a larger number of options to select in composing a document to be printed. As a result, the need to be able to organize and to display printer options in a compact, organized and user-friendly fashion has grown dramatically.

SUMMARY OF THE INVENTION

In accordance with an aspect of the present invention, a method of displaying multiple printer options in a graphical user interface includes dividing a viewing window into first and second portions separated by a first divider including a first visible affordance and displaying a scrollable list of features in the first portion together with a scroll bar. A currently selected one of the features is differentiated from the list in a first visually distinct manner and other selected features of the list are differentiated from the list in a second visually distinct manner. The method also includes dividing the second portion into first and second sub-portions separated by a second divider including a second visible affordance and displaying a print preview image of a selected page in a document in the first sub-portion. The selected page includes the currently selected one of the features. The method also includes displaying controls for the currently selected feature in the second sub portion.

In accordance with another aspect of the present invention, an article of manufacture includes a computer usable medium having computer readable code embodied therein to cause a display to depict a graphical user interface for setting printer options. The graphical user interface includes a first portion showing a scrollable list of print features, a second portion and a first divider separating the first and second portions. The second portion includes a first sub portion displaying a print preview image, a second sub portion displaying controls for a selected feature from the scrollable list and a second divider separating the first and second sub portions. The computer readable program code in the article of manufacture is configured to adjust relative sizes of the first and second portions in response to user adjustment of the first affordance, adjust relative sizes of the first and second sub portions in response to user adjustment of the second affordance, cause a newly user-selected feature in the scrollable list to be displayed in a first visually distinctive manner, display a print preview image corresponding to the newly user-selected feature in the first sub portion and display controls corresponding to the newly user-selected feature in the second sub portion.

In accordance with yet another aspect of the present invention, a computer implemented printer control system includes memory configured to provide an operating system and operative to store files representing at least one document to be printed, a print engine responsive to commands and configured to print a document corresponding to a selected one of the files and a display configured to provide an image of a graphical user interface in a viewing window. The graphical user interface is configured to allow user selection and modification of print engine options for printing the document. The printer control system also includes processing circuitry configured to divide the viewing window into first and second portions separated by a first divider including a first visible affordance, display a scrollable list of features in the first portion together with a scroll bar, differentiate a currently selected one of the features from the list in a first visually distinct manner, differentiate other selected features of the list from the list in a second visually distinct manner, divide the second portion into first and second sub-portions separated by a second divider including a second visible affordance and display a print preview image of a selected page in a document in the first sub-portion. The selected page includes the currently selected one of the features. The processing circuitry is also configured to display controls for the currently selected feature in the second sub portion.

Other features and advantages of the invention will become apparent to those of ordinary skill in the art upon review of the following detailed description, claims, and drawings.

DESCRIPTION OF THE DRAWINGS

FIGS. 3A and 3B are simplified views of a graphical user interface for controlling the printer of FIG. 1 using the process shown in the flow chart of FIG. 2, in accordance with an embodiment of the present invention.

DETAILED DESCRIPTION OF THE INVENTION

Figure 1:
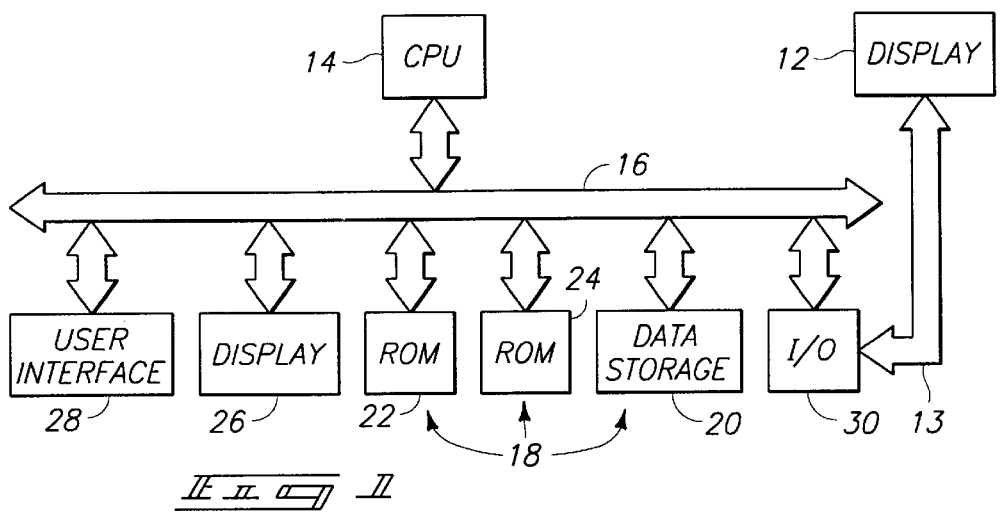
FIG. 1 is a simplified block diagram of a computer system and printer, in accordance with an embodiment of the present invention.

FIG. 1 is a simplified block diagram of a computer system 10 and printer 12 coupled together via a bus 13, in accordance with an embodiment of the present invention. The computer system 10 includes a central processing unit (CPU) 14 that is coupled to a data and address bus 16. The data and address bus 16 is coupled to a memory system 18. In one embodiment, the computer system 10 includes the memory system 18 or other computer readable medium bearing software that will be described below. The memory system 18 includes nonvolatile mass data storage device 20. The nonvolatile mass storage device 20 may include a CD ROM, floppy drive, hard drive, zip drive, floptical storage, optical storage, tape storage or any other forms of data storage and retrieval devices known in the art. The memory system 18 also includes read only memory 22 and random access memory (RAM) 24. A display 26 and a user interface 28 are also coupled to the CPU 14 through the data and address bus 16. The computer system 10 includes I/O devices 30 coupled to the data and address bus 16 to promote data communications between the computer system 10 and external data processing and conditioning devices, including the printer 12.

The user interface 28 includes a keyboard and a cursor manipulating tactile input device, such as a mouse or a touchpad. However, it is understood that other forms of input devices can also be used including voice recognition systems, joysticks, graphics tablets, data readers, card readers, magnetic and optical readers, other computer systems etc. The user receives visual feedback via the display 26. According to one construction, the display 26 comprises a graphics display terminal, such as a CRT display or a liquid crystal display. The user enters commands and text via the user interface 28 and observes feedback from the computer system 10 using the display 26. The CPU 14 operates on data using modules composed of lines of code that may or may not be defined by a subroutine separate from a main program and that typically is stored in RAM 24, in response to the commands from the user, and provides results that may be stored in the memory system 18, displayed on the display 26 or that may be communicated to other devices external to the computer system 10, such as the printer 12. It will be understood that while the invention is described in terms of a computer system 10 and a printer 12 for clarity of explanation and ease of understanding, it may also be practiced in systems that include multiple computers, such as servers and the like.

Figure 2:
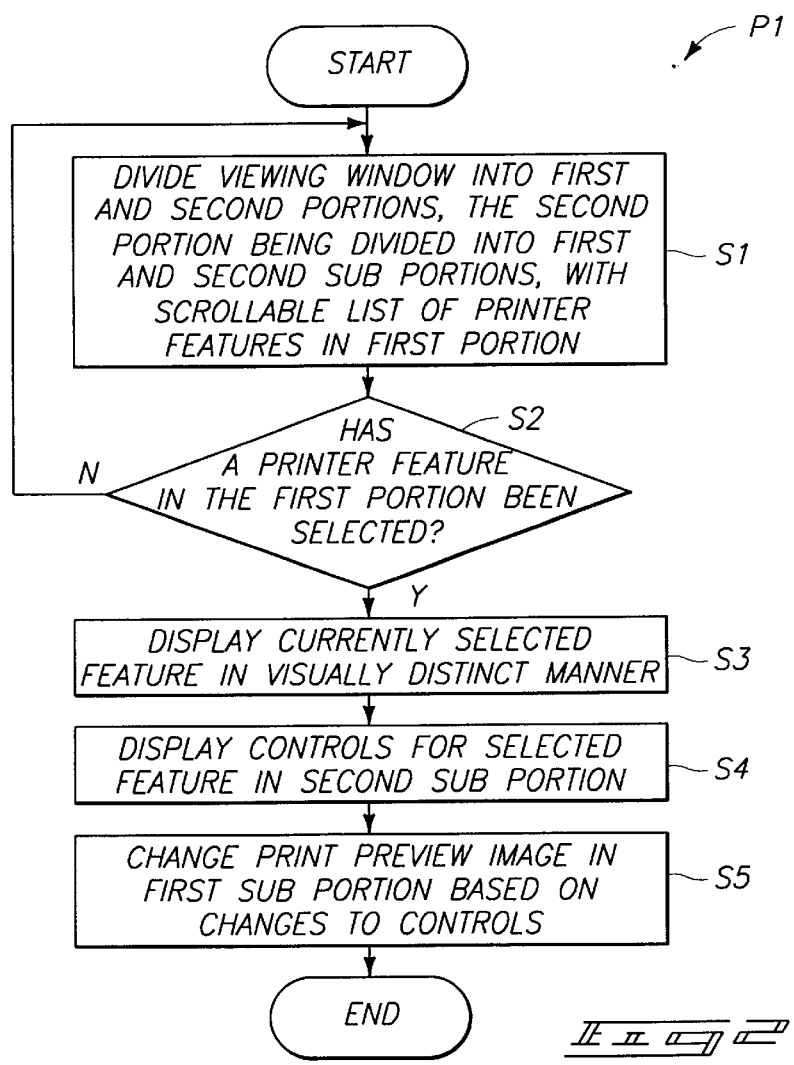
FIG. 2 is a simplified flowchart illustrating a process, in accordance with an embodiment of the present invention.

FIG. 2 is a simplified flowchart illustrating a process P1 in accordance with one aspect of the invention. The process P1 begins with a step S1. In step S1, a viewing window is divided into two portions by a first divider, the second portion is divided into first and second sub portions by a second divider and a scrollable list of features and a scroll bar are displayed in the first portion. In one embodiment, the first divider includes a first visible affordance (shown in FIGS. 3A and 3B). As used herein, the term "affordance" is defined to mean a visible feature having a characteristic from which the user infers (imagines) the operation method. In one embodiment, the second divider includes a second affordance.

In a query task S2, the process P1 determines if a printer feature from the scrollable list has been selected by the user. When no printer feature has been selected from the scrollable list by the user, control passes back to the step S1. When a printer feature has been selected from the scrollable list by the user, control passes to a step S3. In response to a user selecting one of the features from the scrollable list, a currently selected feature is displayed in a first visually distinct manner in the scrollable list in the step S3. For example, the currently selected feature may be displayed as light letters on a dark background, in contrast to a list of features spelt in dark letters on a light background. Other forms of distinctive display, such as bold, underlining, colors, font choice or size and the like may be used to visually distinguish the currently selected feature from other features in the list.

In a step S4, controls for the selected feature are displayed in the second sub portion. In a step S5, a print preview image corresponding to changes made to the controls in the second sub portion is displayed in the first sub portion. The print preview image includes features that have been selected by the user, such as watermarks and the like. When either the controls or the print preview image require more space than is available in the second or first sub portions, scroll bars are provided to allow the user easy access to all portions of these images without compromising the viewability of the images. The process P1 then ends.

FIGS. 3A and 3B are simplified views of a graphical user interface for controlling the printer 12 of FIG. 1 using the process P1 shown in the flow chart of FIG. 2, in accordance with an embodiment of the present invention. FIG. 3A shows a first screen portion 50 and a second screen portion 52 separated by a first divider 54.

In one embodiment, a first affordance 55 is provided at a midpoint of the first divider. In the illustrated example, the first affordance 55 is formed by vertical lines suggesting ridges that are intended to suggest to the user that the first divider 54 may be moved by the user. In one embodiment, the first affordance 55 includes the entire first divider 54. In one embodiment, the first affordance 55 includes less than the entire first divider 54. In one embodiment, the first affordance 55 may be positioned at any position along the first divider 54. In one embodiment, the position of the first affordance 55 may be adjusted by the user.

In one embodiment, the second screen portion 52 is separated into a first sub portion 56 and a second sub portion 58 separated from one another by a second divider 60 having a second affordance 61 located at a midpoint of the second divider 60. In one embodiment, the second affordance 61 includes the entire second divider 60. In one embodiment, the second affordance 61 includes less than the entire second divider 60. In one embodiment, the second affordance 61 may be positioned at any position along the second divider 60. In one embodiment, the position of the second affordance 61 may be adjusted by the user.

In the views shown in FIGS. 3A and 3B, the first divider 54 and the second divider 60 are shown as bars having a width great enough to facilitate easy positioning of, for example, a mouse-driven cursor, on either of the first 55 or second 61 affordances. This allows the user to be able to "click and drag" the dividers 54 or 60 to new locations, using, for example, a mouse-driven cursor.

A third affordance 62 is formed at the intersection of the first 54 and second 60 dividers. In the illustrated examples, the third affordance 62 is denoted by a square positioned at a junction of the first 54 and second 60 dividers. Relative sizes of the first 50 and second 52 portions, as well as the first 56 and second 58 sub portions, may be simultaneously adjusted by a user by clicking on and then dragging the third affordance 62 in any direction. In one embodiment, an input device in the user interface 28 of FIG. 1, such as a mouse, may be used to "click and drag" the first divider 54 or the first affordance 55 left or right to adjust relative sizes of the first 50 and second 52 portions. Other devices for user input, such as touch screens, joy sticks or graphics tablets, may be used instead of or in addition to a mouse. In one embodiment, the input device may be used to click and drag the second divider 60 or the second affordance 61 to adjust relative sizes of the first 56 and second 58 sub portions. When the amount of information that is to be shown in the first 56 or second 58 sub portions exceeds what may be displayed without compromise of readability, scroll bars are generated to allow portions of the information to be clearly viewed under user control. In one embodiment, the third affordance 62 may be adjusted by the user to simultaneously adjust the relative sizes of the first 50 and second 52 portions and the first 56 and second 58 sub portions.

A list 64 of printer features is displayed in the first portion 50, together with a scroll bar 66. This allows the user to rapidly scan features in the list 64 and to select features in the list 64 for modification from their default settings, using, for example, a mouse-driven cursor. When the user selects a feature from the list 64, that feature is shown in a first visually distinct manner in the list of features 64. In the example of FIG. 3A, the "Staple" feature is selected, and is shown as a negative image (represented in FIG. 3A by a box surrounding the entry "Staple" in the list of features 64). When a feature is selected from the list 64, the second sub portion 58 is used to display controls for that feature. In the example shown in FIG. 3A, the controls for the "Staple" feature include "Staple this Job Using" (allowing selection of stapling or not stapling the printed document). When the "Staple this Job Using" feature is selected, choices are offered between one staple, two staples, three staples, six staples or custom staples. This allows the user to select the number of staples and their placement. When the "one staple" option is selected, the user also is allowed to choose whether to place the staple at an angle or parallel to one side of the document that is to be printed.

Other kinds of options that may be selected include "Watermarks," "Print on Both Sides," "Multiple Pages per Sheet," "Booklet Printing," "Copies" and "Colored Text." Printer options include selection of a target printer, selection of a paper source (or size), selection of an output bin and the like.

Selection of these options will cause the controls displayed in the second sub portion 58 to change to the controls appropriate for the option that is currently selected.

The first sub portion 56 displays a print preview image 68 showing placement of the three staples 69. The first sub portion 56 also displays a page selector such as a scroll bar 70. The scroll bar 70 allows the user to select a specific page in the document, using, for example, a mouse-driven cursor. The print preview image 68 shows the selected page as it will appear when it is printed. In the example of FIG. 3A, the list 64 includes the "Watermark" feature displayed in a second visually distinctive fashion. In the example of FIG. 3A, the second visually distinctive fashion displays the feature in bold text to indicate that the "Watermark" feature has been modified from the default value for at least one page of the document that is being previewed in the print preview image 68. It will be appreciated that other visually distinctive displays may also be used, such as underlining, colors, choice of font and the like.

FIG. 3B shows the first 50 and second 52 portions of the viewing screen, but with the "Watermarks" feature selected on the list of features 64. As a result, the second sub portion 58 displays controls for the "Watermarks" feature. Additionally, the "Multiple Pages Per Sheet" feature is also displayed, but in a third visually distinct fashion, in this case using underlining. This indicates that the mouse-driven cursor is positioned so that it is ready to select that feature, but the user has not yet selected the feature.

In both FIGS. 3A and 3B, a watermark feature is represented in the print preview image 68 as "hollow" text (appearing as a transparent outline). In practice, a light gray watermark might be both displayed in the print preview image 68 and on the printed document.

Figure 4:
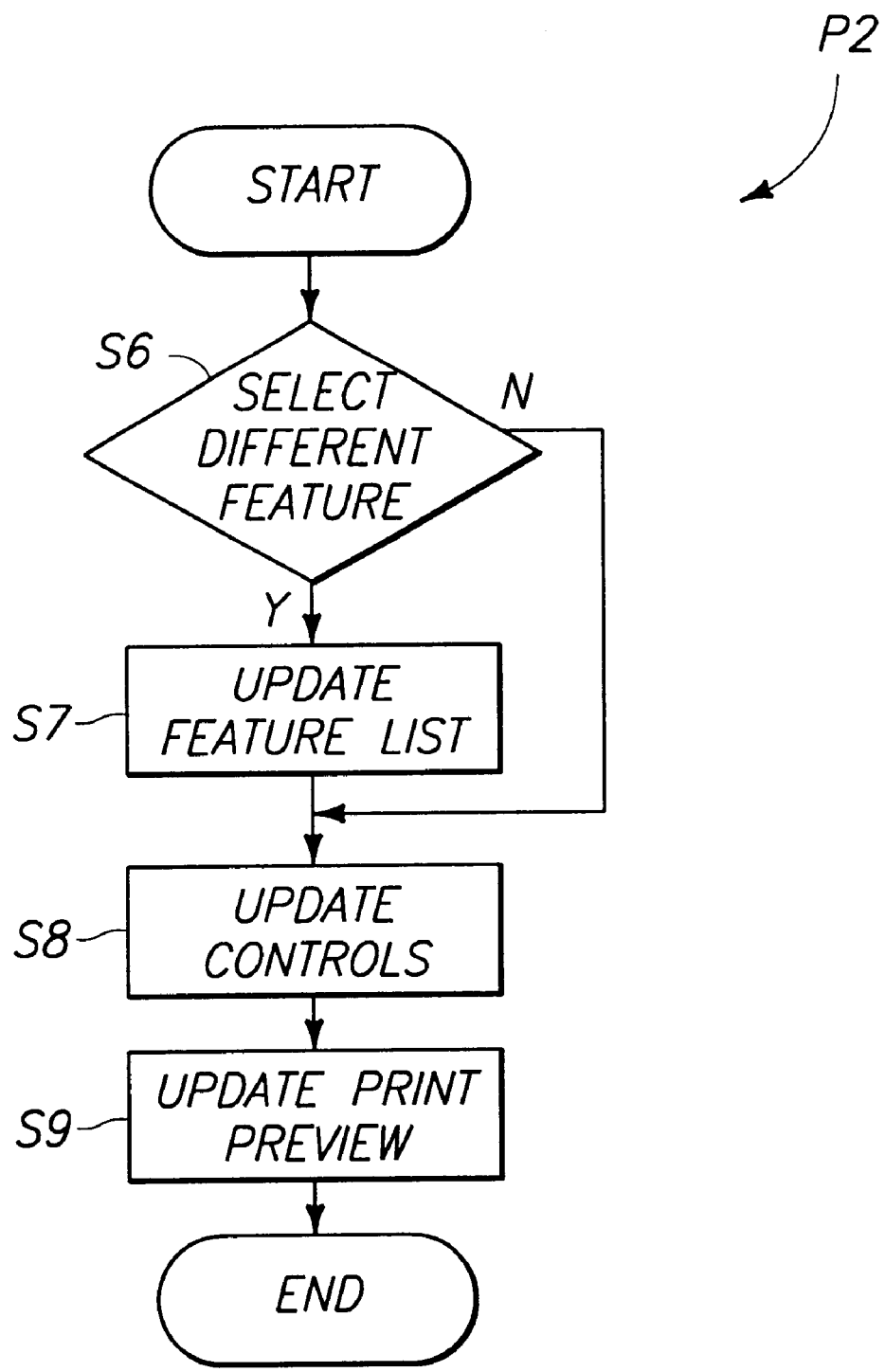
FIG. 4 is a simplified flowchart of a process for updating information for the graphical user interface of FIGS. 3A and 3B, in accordance with an embodiment of the present invention.

FIG. 4 is a simplified flowchart of a process P2 for updating information for the graphical user interface of FIGS. 3A and 3B, in accordance with an embodiment of the present invention. The process P2 begins with a query task S6 in which the process P2 determines if the user is selecting a different feature from the list of features 64 of FIGS. 3A and 3B or is modifying control options for a previously-selected feature on the list of features 64. When the query task S6 determines that a new feature is to be selected, control passes to a step S7. The feature list 64 is updated in the step S7 to visually distinguish the selected feature from other features on the list 64. In either case, control then passes to a step S8. The controls or their settings are updated in the step S8. When a different feature is being selected from the list of features 64, the updates to the controls in the sub portion 58 are linked to the newly-selected feature. When new control settings are being selected for a selected feature, the new control settings are applied to that feature. In either case, any updates to the print preview image 68 are made in a step S9 and the process P2 then ends.

Benefits of the graphical display include providing more space per feature than is possible with a tab-type of display. Additionally, as features are added or expanded with tab-type displays, the tabs become smaller and are more crowded. This makes it more difficult for the user to determine what feature is being selected. Because space on the scrollable list is unlimited, features may be easily added to the list without adverse usability impact and do not have to be arbitrarily grouped as they are in tab-type displays. A scrollable list allows more descriptive titles than are appropriate for tab-type displays, because more space is available for each title in the list of features than in a tab-type display. The three affordances allow the user to easily adjust the display in accordance with the features that the user is selecting. The print preview image 68 is always displayed in a consistent fashion to provide visual feedback reflecting the current settings of the printing features. Displaying only the controls for the currently selected feature in the second sub portion 58 allows those controls to be viewed without distracting the user with controls for other features. Additionally, selection of a new feature is less disruptive for the user because only the control portion of the display changes when a new feature is selected. Inclusion of scroll bars when a feature or control display requires more space than is available allows complex features to be fully accessible to the user, even on very small screens.

The protection sought is not to be limited to the disclosed embodiments, which are given by way of example only, but instead is to be limited only by the scope of the appended claims.

What is claimed is:

1. A method of displaying multiple printer options in a graphical user interface comprising:

dividing a viewing window into first and second portions separated by a first divider including a first visible affordance;

displaying a scrollable list of features in the first portion together with a scroll bar, a currently selected one of the features being differentiated from non-selected features in the list in a first visually distinct manner and other selected features of the list being differentiated from non-selected features on the list in a second visually distinct manner;

dividing the second portion into first and second sub-portions separated by a second divider including a second visible affordance;

displaying a print preview image of a selected page in a document in the first sub-portion, the selected page including the currently selected one of the features;

displaying controls for the currently selected one of the features in the second sub portion; and displaying a third visual affordance at a juncture between the first and second dividers; and adjusting relative sizes of the first and second portions and the first and second sub portions in response to a user directing motion of the third affordance.

2. The method of claim 1, further comprising adjusting relative sizes of the first and second portions in response to a user directing motion of the first affordance.

3. The method of claim 1, further comprising adjusting relative sizes of the first and second sub portions in response to the user directing motion of the second affordance.

4. The method of claim 1, further comprising introducing a page selector adjacent the print preview image to allow the user to select a specific page of a document being prepared for the print preview image.

5. The method of claim 1, further comprising:

altering the currently selected one of the features to another feature in response to a command from a user;

displaying the another currently selected feature in the list in the first visually distinct manner; and altering the second sub portion to display controls for the another feature.

6. The method of claim 1, further comprising:

altering print attributes in response to commands from a user selected from the controls in the second sub portion; and modifying the print preview image in the first sub portion in accordance with the commands from the user that were selected from the controls in the second sub portion.

* * * * *